D. C. THOMAS.
TIRE.
APPLICATION FILED DEC. 5, 1910.
991,563.
Patented May 9, 1911.
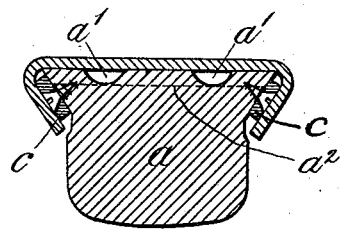
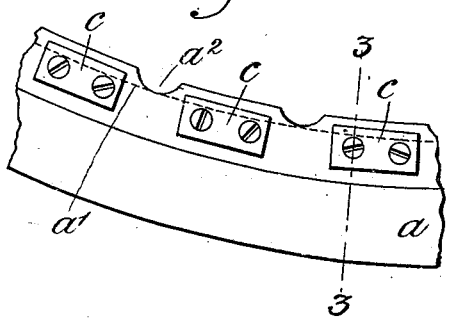
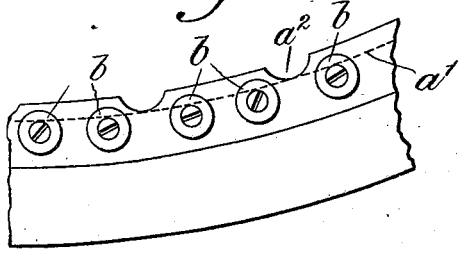
Witnesses.
Inventor.
David C. Thomas
by his attorneys.

UNITED STATES PATENT OFFICE.

DAVID CYNRIG THOMAS, OF BRONWYDD, LLANISHEN, ENGLAND.

TIRE.

991,563.

Specification of Letters Patent.   Patented May 9, 1911.

Application filed December 5, 1910. Serial No. 595,682.

*To all whom it may concern:*

Be it known that I, DAVID CYNRIG THOMAS, a subject of the King of Great Britain, residing at Bronwydd, Llanishen, in the county of Glamorgan, Wales, England, have invented a new and useful Tire, of which the following is a specification.

This invention relates to that class of solid elastic tires in which the whole tire has a certain freedom of movement within its rim, that is to say, movement is not restrained by screws or the like engaging with the rubber or by the use of cement. It has been found that when tires of this type are made sufficiently resilient their edges become heated by friction against the rim when moving radially which causes the rubber to deteriorate.

According to this invention I attach to the inclined sides of a tire of dovetail cross-section and which abuts against the flanges of a wheel strips or washers of leather or other suitable hard substance. These strips or washers are of relatively small size so as not to impair the resiliency of the tire, and when a tire provided with longitudinal and transverse grooves of the kind shown in my Patent No. 836,286 of November 20, 1906 is used, each strip or washer is preferably made not larger than the space between two transverse grooves.

In the accompanying drawings, Figure 1 shows a side elevation of a portion of a tire with my improvements applied. Fig. 2 is a similar view showing a modified construction. Fig. 3 shows a transverse section of the tire on the line 3—3 of Fig. 1, and Fig. 3 also shows such a tire mounted in a wheel rim.

In Figs. 1 and 2 $a$ indicates the tire provided with longitudinal grooves $a'$ and transverse grooves $a^2$ similar to those shown in my U. S. Patent above mentioned. The inclined edges of the tire next the rim, as shown in Fig. 1, are provided with strips $c$ of leather or other suitable relatively hard material which are fixed to the rubber by means of screws, as indicated, or other fastening devices may be employed. These strips $c$ stand out from the surface of the rubber and they are separated from each other a considerable distance. They are of small size so as not to impair the resiliency of the tire and each one is shorter than the space between two adjacent transverse grooves $a^2$ so that air may circulate around the sides of the tire within the rim. Instead of employing rectangular strips $c'$, as shown in Fig. 1, washers $b$, like those shown in Fig. 2, may be used.

By the construction shown the tire is prevented from moving radially away from the rim and by means of the grooves $a'$, $a^2$ it is given more elasticity at its inner portion than at its outer portion. Therefore the inner portion as it is compressed and expanded will move radially in the rim but the strips or washers which also move with the inner portion of the rim alone move in contact with the sides of the rim, thus avoiding frictional contact between the sides of the rim and the sides of the inner portion of the tire and hence prevent the heating of the rubber.

I am aware that strips of metal have been applied to the radial sides of the base of a tire of dovetail section and that strips of canvas have been applied to the inclined side of a tire of dovetail section. I do not claim this construction.

I claim as my invention:

The combination with the rim of a wheel of a solid elastic tire of dove-tail section, whose inner circumference is provided with longitudinal and transverse grooves to render it more elastic and radially movable and permit the circulation of air, and a series of separated relatively short pieces of hard material attached to the sides of the tire between the transverse grooves which extend out from the sides of the tire, bear against the sides of the rim, hold the tire out of contact therewith and move radially with the tire.

DAVID CYNRIG THOMAS.

Witnesses:
JOHN HENDERSON WHITEHEAD,
WALTER J. SKERTEN.

---

Copies of this patent may be obtained for five cents each, by addressing the "Commissioner of Patents, Washington, D. C."